United States Patent [19]

Taylor

[11] Patent Number: 5,577,523

[45] Date of Patent: Nov. 26, 1996

[54] METHOD OF MAKING RELIEF VALVE INTERCHANGEABLE BUCKLING PINS FOR A SELECTABLE PRESSURE SETTING

[76] Inventor: Julian S. Taylor, 8300 SW. 8th, Oklahoma City, Okla. 73128

[21] Appl. No.: 517,025

[22] Filed: Aug. 18, 1995

[51] Int. Cl.$^6$ .................................................. F16K 17/14
[52] U.S. Cl. .......................... 137/70; 137/15; 29/890.124
[58] Field of Search ............................ 137/70, 71, 15; 129/890.124

[56] References Cited

U.S. PATENT DOCUMENTS

| | | | |
|---|---|---|---|
| 4,724,857 | 2/1988 | Taylor | 137/67 |
| 5,067,511 | 11/1991 | Taylor | 137/67 |
| 5,146,942 | 9/1992 | Taylor | 137/67 |

*Primary Examiner*—John C. Fox
*Attorney, Agent, or Firm*—Robert K. Rhea

[57] ABSTRACT

A method of making relief valve interchangeable buckling pins for selecting the pressure release setting of a relief valve. Comprises selecting a slender column having a uniform diameter of predetermined dimension cutting the column to a predetermined length and axially bonding a pair of right circular cylindrical adapters to respective end portions of the slender column to achieve a longitudinal dimension compatible with a given pressure relief valve.

2 Claims, 2 Drawing Sheets

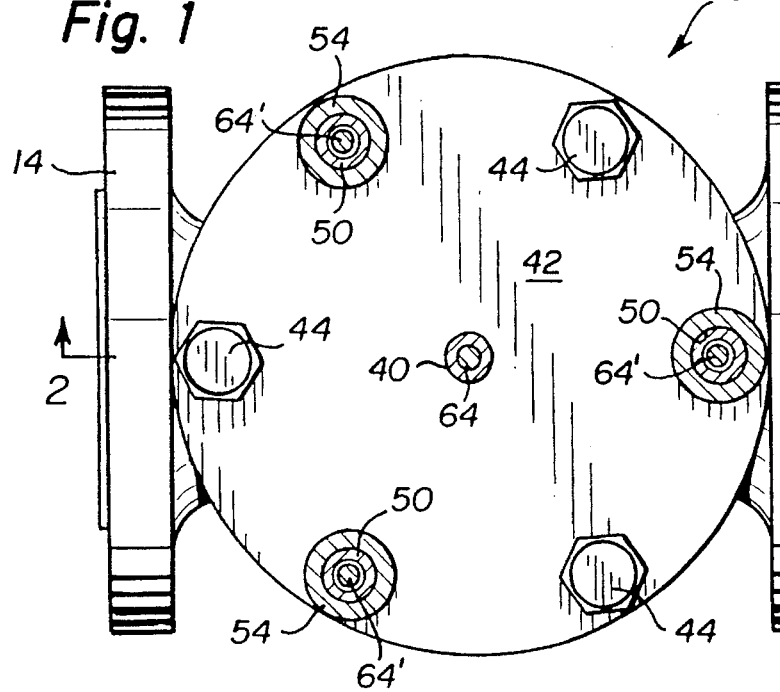
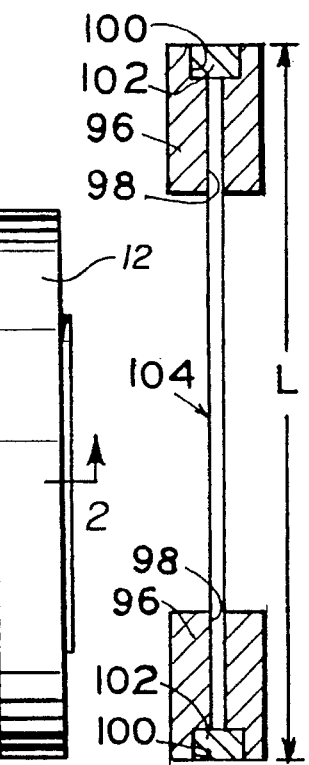
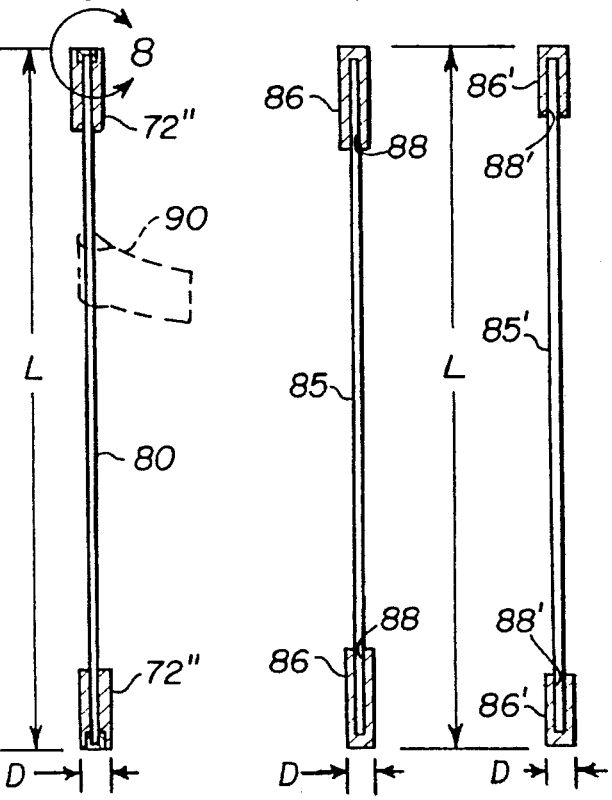

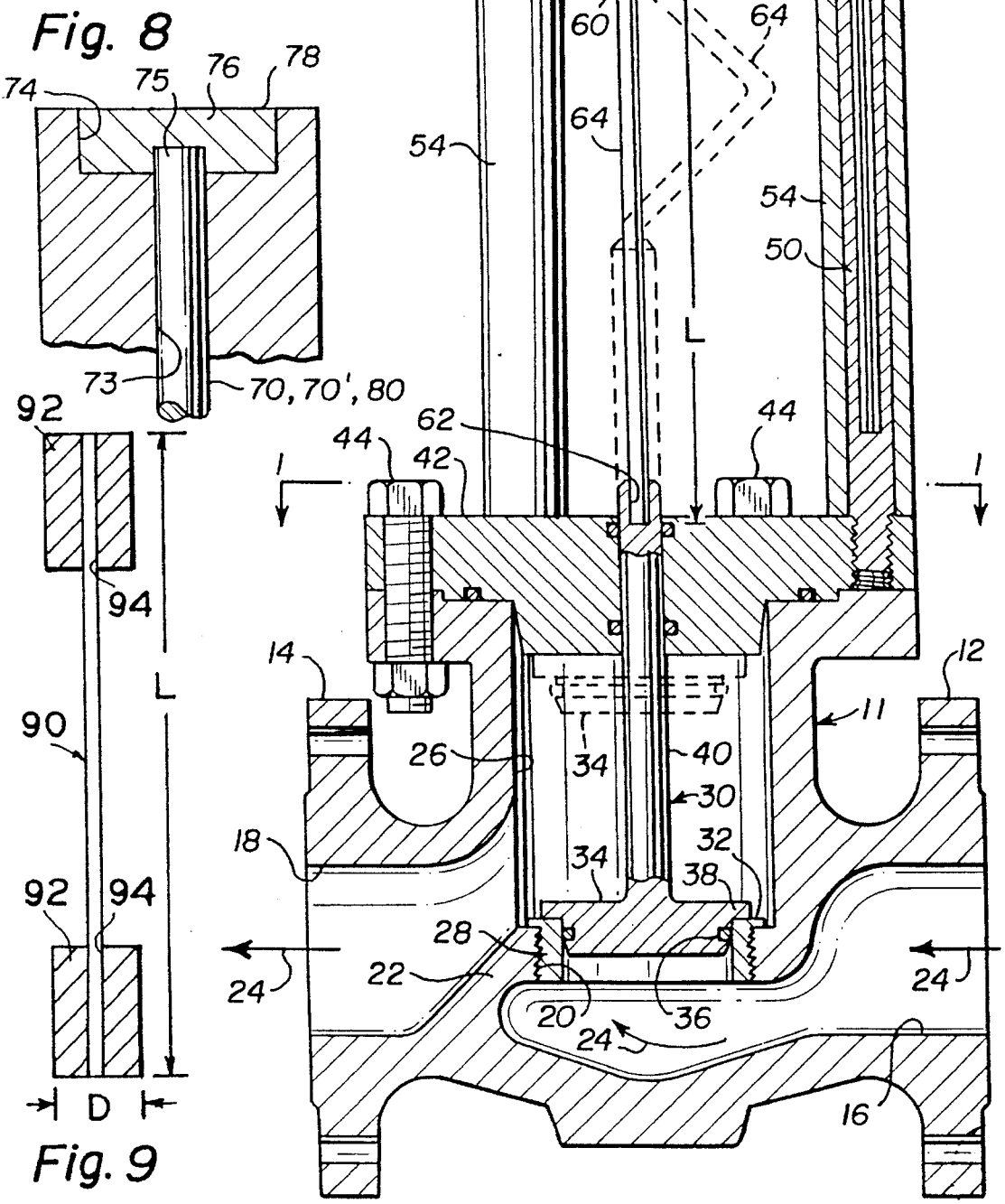

METHOD OF MAKING RELIEF VALVE INTERCHANGEABLE BUCKLING PINS FOR A SELECTABLE PRESSURE SETTING

BACKGROUND OF THE INVENTION

1. Field of the Invention.

This invention relates to fluid pressure relief valves utilizing a slender column having a predetermined collapsible or buckling point value for releasing excess pressure above a predetermined value and more particularly to a method of making a plurality of interchangeable buckling pins each having a predetermined buckling point different from the buckling point of companion buckling pins.

Relief valves are conventionally used in industrial fluid pressure systems for the purpose of safety and protecting operating personnel as well as equipment and preventing pollution of the environment. Pressure relief valves utilizing a slender pin or column as a collapsible or buckling pin in accordance with Euler's law for releasing excess pressure have been in use for several years. The slender column or buckling pin is usually contacted at one end by one end portion of a piston-like member facing a fluid column at its other end and having a seat or seal within a sleeve or cylinder allowing slight movement of the piston in a pin buckling direction as the pin initially bends elastically, slightly, prior to releasing fluid pressure without the piston seal with its seat being opened.

This type of pressure relief valve and its associated buckling pin are usually made or fabricated for a particular pressure setting and since the end mountings of the buckling pin are critical to monitoring and releasing excess fluid pressure at a predetermined value retrofitting such a valve with a buckling pin having a different pressure release valve is not easily accomplished.

This problem is obviated by the hereinbelow described method of making interchangeable buckling pins for selecting a predetermined pressure release value for a given pressure relief valve.

2. Description of the Prior Art.

The most pertinent patent is believed to be my U.S. Pat. No. 4,724,857 issued Feb. 16, 1988 for PRESSURE RELIEF VALVE. This patent discloses a plurality of different buckling pins which may be used in this valve for monitoring pressure. However, all of the disclosed buckling pins have identical pressure setting values which buckle by movement of the piston toward an opening direction of the piston in response to a predetermined pressure value against the piston.

U.S. Pat. No. 5,067,511 issued Nov. 26, 1991 to Taylor for HIGH PRESSURE FLUID EMERGENCY SHUT OFF VALVE and U.S. Pat. No. 5,146,492 issued Sep. 15, 1992 issued to Taylor for LOW PRESSURE FLUID EMERGENCY SHUT DOWN VALVE are believed good examples of the further state-of-the-art.

U.S. Pat. No. 5,067,511 discloses fluid flowing through a right angular valve body containing a normally open valve having its stem supporting one end of a collapsible pin and moved toward the pin by excess fluid pressure acting against the unbalanced valve stem area for buckling the pin in response to excess pressure and seating the valve closing fluid flow through the fluid passageway.

The other U.S. Pat. No. 5,146,942 similarly discloses a right angle valve body forming a fluid passageway and containing a valve having a stem connected with a diaphragm in a diaphragm chamber and bearing against the end of a collapsible or buckling pin so that excess pressure in the diaphragm chamber opposite the pin biases the diaphragm toward the pin to collapse or buckle the pin and move the valve toward its seat closing the flow passageway.

This invention is distinctive over the above named patents by disclosing a method of making interchangeable buckling pins each having an individual pressure rating which is capable of retrofitting any one of the above named patents and including the valve disclosed by this invention.

SUMMARY OF THE INVENTION

A flanged end valve body is provided with axially aligned inlet and outlet ports and includes a lateral bore intersecting a transverse web between the ports to form a fluid passageway and a cylindrical valve seat. A valve having a piston-type valve head sealed with the valve seat by an O-ring includes a valve stem projecting axially outward through a bonnet closing the lateral bore. The bonnet supports a collapsible pin cage formed by a plate maintained in parallel spaced relation with the bonnet by a plurality of posts extending between the bonnet and the plate. The plate supports a pin nut in axial alignment with the valve stem. Adjacent end portions of the pin nut and valve stem are axially bored for receiving respective end portions of a buckling pin normally maintaining the valve seated until excess upstream fluid pressure unseats the valve by collapsing or buckling the pin for releasing the excess pressure through the outlet port.

The buckling pin being replaceable with any one of a plurality of buckling pins each having an overall length equal to the spacing between inward ends of the bores in the pin nut and valve stem and having a diameter or diametric end portions closely received by the bores in the pin nut and valve stem.

The principal object of this invention is to disclose the method of making a plurality of interchangeable collapsible or buckling pins for monitoring fluid pressure in which each pin is exactly dimensioned longitudinally and diametrically equal with other pins of the plurality of pins and in which each pin has its own predetermined buckling point in response to axial pressure applied to the pin when interposed between a moveable member and a stationary member in a fluid pressure relief valve.

DESCRIPTION OF THE PREFERRED EMBODIMENTS

Like characters of reference designate like parts in those figures of the drawings in which they occur.

FIG. 1 is a top view, partially in section, looking in the direction of the arrows 1—1 of FIG. 2;

FIG. 2 is a vertical cross sectional view taken substantially along the line 2—2 of FIG. 1;

FIGS. 3, 4, 5, 6, and 7 are longitudinal sectional views of a plurality of fluid pressure buckling pins in accordance with the invention;

FIG. 8 is an enlarged cross sectional view, partially in elevation, of the area encompassed by the arrows 8 of FIG. 5; and, FIGS. 9 and 10 illustrate additional embodiments of buckling pins construction.

DESCRIPTION OF THE PREFERRED EMBODIMENTS

Like characters of reference designate like parts in those figures of the drawings in which they occur.

The reference numeral 10 indicates a valve comprising a valve body 11 having bolt flange ends 12 and 14 having axially aligned inlet and outlet ports 16 and 18, respectively. The valve body is provided with a lateral bore 20 intersecting a web 22 extending transversely through the body between the inlet and outlet ports 16 and 18 to form a flow passageway through the valve in the direction of the arrows 24.

The bore 20 is counterbored as at 26 for receiving a sleeve-like valve seat 28 and a valve 30. The valve seat 28 is threadedly connected with the web 22 and is characterized by an annular flange forming a downstream shoulder 32 abutting the inward end of the counterbore 26. The valve 30 includes a piston type valve head 34 normally sealed with the inner periphery of the valve seat 28 by an O-ring 36 and includes an annular flange 38 abutting the valve seat shoulder 32. The valve 30 further includes a valve stem 40 projecting axially outward through a bonnet 42, O-ring sealed with the body 11 and valve stem 40, closing the counterbore 26 by bolts 44 securing the bonnet to the valve body.

Pin cage means 46 extends laterally from the body and is Supported by the bonnet 42. The pin cage means comprises a plate 48 maintained in spaced parallel relation with respect to the adjacent surface of the bonnet by a plurality (3) posts 50 threadedly secured at one end in circumferential equally spaced relation to the bonnet 42 and projecting axially through a like plurality of apertures 52 in the plate 48.

A post surrounding sleeve 54 is interposed between the plate 48 and adjacent surface of the bonnet 42 and impinged by a nut 56 threadedly connected with the respective post on that side of the plate opposite the bonnet. The plate 48 threadedly supports a pin nut 58 in axial alignment with the valve stem 40. The confronting ends of the pin nut 58 and valve stem 40 are axially drilled, as at 60 and 62, a selected depth on a diameter D so that the spacing or distance, between the inner ends of the bores 60 and 62, is a predetermined distance or dimension L for the purposes which will presently be explained.

A pin 64 having a diameter equal to the diameter D and a overall length equal to the length indicated by the dimension line L and having a predetermined pressure collapsible rating or buckling point is inserted into the bores 60 and 62 by loosening the pin cap 58 for insertion of the pin and retightening the pin cap 58 so that the inner end of its bore firmly contacts the adjacent end of the pin and seats the opposite or downward end of the pin in the valve stem bore 62.

The posts 50 are drilled from their ends opposite the bonnet to form sockets for receiving spare pins 64' for replacing the pin 64 when buckled. The replacement pins 64' are secured by acorn nuts 65 on the respective post 50.

In the operation of the valve 10 excess upstream fluid pressure against the valve head 34 biases the valve to its dotted line position (FIG. 1) releasing excess pressure through the outlet port 18. Simultaneously, the movement of the valve to its dotted line position collapses or buckles the pin 64 as illustrated by dotted lines. After correcting the malfunction, which includes removing fluid pressure from the passageway 24, the buckling pin is replaced by removing the pin nut 58 and the buckled pin 64 and manually moving the valve head 34 to seat with its seat 28 by pushing the valve stem 40 downwardly. A new buckling pin 64' is obtained from one of the posts 50 by removing the acorn nut 65. Alternatively, one of the hereinafter described buckling pins having a different pressure rating may be employed if desired. After installing the fresh buckling pin, the pin nut 58 is replaced allowing the fluid pressure to again be restored and monitored by the new rupture pin.

Referring now to the remaining Figures and more particularly to FIGS. 3–5 and 8, a preferred method of manufacturing a plurality of identical length and adapter diameter buckling pins, each having a predetermined fluid pressure rating for failure of the pin in a collapsible or buckling action when axial force is applied to the pin which may be readily inserted into the above described pressure relief valve without modification of any of the valve components, will be described.

A selected length and diameter slender column 70 forms a buckling pin having a known buckling point in accordance with Euler's law for slender columns. The length of the column 70 being less than the dimension L of the buckling pin 64 for the reasons believed presently apparent.

A pair of centrally bored cylindrical adapters 72, each having a predetermined length and a bore diameter equal with the diameter of the buckling pin 64, are coaxially received by the respective end portions of the column 70.

The bore 73 of the respective adapter closely receives the outside diameter of the column 70 and one end of the bore 73 of the respective adapter 72 is counterbored on a selected diameter, as at 74 (FIG. 8) for exposing the adjacent end portion 75 of the column.

The counterbored end portion of each adapter 72 is then welded to the adjacent end portion 75 of the pin and the counterbore is sealed with metallic material from the welding rod forming a fillet 76 integrally joining the respective adapter 72 to the respective end portion 75 of the column. The metallic material forming the respective fillet 76 initially projects beyond the end limit of the respective adapter opposite the adapter at the other end of the column and is ground off of the end of each adapter and fillet opposite the adapter and fillet at the other end of the pin to form an end surface, indicated by the lines 78, normal to the external wall surface of the respective adapter and forming a buckling pin having a dimension L, between the parallel end surfaces 78, identical with the dimension L of the buckling pin 64 and the dimension L between the inner end limit of the cap nut bore 60 and the valve rod bore 62 and having an end diameter D substantially equal with the bores 60 and 62.

Referring now to FIG. 4, a substantially identical column 70' having an identical buckling point rating with respect to the column 70 may be manufactured to provide a higher or increased pressure buckling point for the column 70' when compared with the column 70 by shortening the effective lengh of the column 70'. This is accomplished by increasing the length of the respective adapter 72' with respect to the longitudinal length of the adapters 72.

Effectively shortening the distance or spacing S between the confronting end surfaces of the adapters 72' shortens the longitudinal length of the column 70' subject to the bending action of a force applied to opposite ends of the column 70'.

Referring also to FIG. 5, another column 80 of similar length with respect to the columns 70 and 70' but of smaller diameter forming a buckling pin having a lower pressure value rating for monitoring fluid pressure applied to opposite ends of the column is similarly formed by adapter members 72" each having a diameter D and having a length intermediate the lengths of the adapters 72 and 72' including the fillet construction and fillets at opposite ends of the column 80.

FIG. 6 illustrates another method of forming interchangeable relief valve buckling pins having a selected buckling point. This is accomplished by selecting a column 85 having a length slightly less than the dimension L and providing similar adapters 86 having the diameter D and a slected length. The adapters 86 are axially bored from one end to form sockets 88 closely receiving respective end portions of the column 85, and exposing a predetermined length of the column between adjacent ends of the adapters 86. The end surface of each adapter 86 opposite its bore is equal to or machine ground to equal the length L with the respective end surface being normal to the outer surface of the respective adapter 86. A suitable commercial bonding agent, preferably the one presently marketed under the trademark LOCKTITE applied to respective end portions of the column 85 or the bore 88 of the respective adapter bonds the adapters to the end portions of the column 85.

Referring also to FIG. 7, a column 85' having a different diameter than the column 85 and a similar overall length has its respective end portions inserted into bores 88' axially formed in one end portion of a pair of adapters 86'. The adapters 86' have a different length than the length of the adapters 86 to expose a selected portion of the column 85' and achieve a desired buckling point. The adapters 86' being similarly bonded by a commercial bonding agent, not shown, to respective end portions of the column 85'.

FIGS. 9 and 10 illustrate additional buckling pins formed by bonding adapters to the respective ends of the pins to similarly form buckling pins having individual buckling point values.

The reference numeral 90 indicates a slender column having a length L and right circular end surfaces. The end portions of the column 90 are respectively inserted into a pair of centrally bored right circular cylindrical adapters 92 having the desired diameter D and a selected length with the end surfaces of each adapter opposite the other lying in the plane of the respective end surface of the column 90 so that the assembled pin is characterized by parallel right circular end portions.

Referring now to FIG. 10, a similar pair of right circular cylindrical members form adapters 96 which are axially bored and counterbored as at 98 and 100 with the respective counterbore filled with a right circular cylindrical plug 102 bonded in place, as by the bonding agent LOCKTITE. A cylindrical column 104 having a predetermined length equal with the spacing between the respective adapter plug 102 when the counterbored end of the adapters 96 are oppositely disposed in axial aligned relation equal with the dimension L. The respective end portion of the column 104 is inserted into the respective bore 98 and bonded to the respective wall forming the bores 98, as by the commercial bonding agent LOCKTITE.

Each buckling pin manufactured, as illustrated by FIGS. 3–10, is individually identified by a tag 90 (FIG. 5) listing the dimensions of its diameter D, length L and pressure rating value.

Obviously the invention is susceptible to changes or alterations without defeating its practicability. Therefore, I do not wish to be confined to the preferred embodiment shown in the drawings and described herein.

I claim:

1. A method of making interchangeable fluid pressure relief valve buckling pins for selectively changing the fluid pressure relief rating of a given relief valve, comprising the steps of:

a) providing an elongataed slender column having a selected uniform diameter;

b) cutting said column to a preselected length;

c) providing a pair of right circular cylinders, each cylinder of said pair of cylinders having a predetermined diameter and length;

d) axially boring each cylinder of said pair of cylinders from one end to form a pair of adapters with each adapter of said pair of adapters having a socket of predetermined depth and diameter capable of closely receiving a respective end portion of said column; and, e) bonding the wall forming the socket in each adapter of said pair of adapters on the respective end portion of said column to form a fluid pressure responsive buckling pin having a predetermined dimension between the end surfaces of the pair of adapters opposite the column.

2. A method of making interchangeable fluid pressure relief valve buckling pins for selectively changing the fluid pressure relief rating of a given relief valve, comprising the steps of:

a) providing an elongated slender column having a selected uniform diameter;

b) cutting said column to a preselected length;

c) providing a pair of right circular cylinders, each cylinder of said pair of cylinders having a predetermined diameter and length;

d) axially boring each cylinder of said pair of cylinders to form a pair of adapters, each adapter of said pair of adapters having a bore capable of closely receiving a respective end portion of said column; and, e) axially bonding each adapter of said pair of adapters on the respective end portion of said column to form a buckling pin having a predetermined longitudinal dimension between the end surfaces of the pair of adapters opposite the column.

\* \* \* \* \*